United States Patent
Gormeley et al.

(10) Patent No.: US 11,432,653 B1
(45) Date of Patent: Sep. 6, 2022

(54) SYSTEM, APPARATUS, AND METHOD FOR SUPPORTING A USER'S BODY

(71) Applicants: Eric Gormeley, Hoboken, NJ (US); Thomas Travers, Tampa, FL (US)

(72) Inventors: Eric Gormeley, Hoboken, NJ (US); Thomas Travers, Tampa, FL (US)

( * ) Notice: Subject to any disclaimer, the term of this patent is extended or adjusted under 35 U.S.C. 154(b) by 0 days.

(21) Appl. No.: 17/692,729

(22) Filed: Mar. 11, 2022

(51) Int. Cl.
A47C 7/38 (2006.01)
A47C 16/00 (2006.01)
B60N 2/885 (2018.01)

(52) U.S. Cl.
CPC ............. *A47C 7/383* (2013.01); *B60N 2/885* (2018.02)

(58) Field of Classification Search
CPC .. A47C 7/383; A47C 16/00; A47G 2009/003; A47G 9/1027; A61H 1/0296; A61H 2201/0103
See application file for complete search history.

(56) References Cited

U.S. PATENT DOCUMENTS

| | | | |
|---|---|---|---|
| 5,345,630 A * | 9/1994 | Healy | A47C 20/048 5/634 |
| 5,454,781 A * | 10/1995 | Chitwood | A61F 5/055 606/240 |
| 6,012,186 A * | 1/2000 | Soltani | A47C 31/008 5/613 |
| 6,289,538 B1 | 9/2001 | Fidge | |
| 6,317,909 B1 * | 11/2001 | Blum | A61G 5/14 297/DIG. 10 |
| 7,670,307 B2 * | 3/2010 | Chitwood | A61H 1/0296 128/869 |
| 7,788,751 B1 * | 9/2010 | Diemer | A47C 7/383 5/640 |
| 8,303,626 B2 * | 11/2012 | Fischer | A61F 5/055 606/241 |
| 8,763,180 B1 | 7/2014 | Tsai | |
| 9,226,587 B2 | 1/2016 | Halimi | |
| 10,159,354 B2 | 12/2018 | Rayburn | |
| 10,555,612 B2 * | 2/2020 | Kellock | A47C 7/383 |
| 10,681,999 B2 * | 6/2020 | Wagner | A47G 9/1027 |
| 11,197,555 B2 * | 12/2021 | Wittekind | A61G 7/07 |
| 2002/0050009 A1 | 5/2002 | Ley | |
| 2012/0047656 A1 | 3/2012 | Benton | |
| 2015/0366368 A1 * | 12/2015 | Cheng | A47C 7/467 5/644 |
| 2019/0038053 A1 | 2/2019 | Brantingham | |
| 2021/0045553 A1 * | 2/2021 | Kang | A47G 9/1027 |

FOREIGN PATENT DOCUMENTS

KR 10-0839364 B1 6/2008
WO 2013/120207 8/2013

OTHER PUBLICATIONS

Sunany Brand Device available on Amazon website, printed Jan. 2022, 12 pages.

\* cited by examiner

*Primary Examiner* — Shin H Kim
(74) *Attorney, Agent, or Firm* — Stephen L. Keefe LLC (57) ABSTRACT

An apparatus is disclosed. The apparatus has a housing forming a housing cavity, an inflatable assembly attached to the housing, and a member attached to the inflatable assembly. When the inflatable assembly is deflated, the inflatable assembly is configured to be disposed in the housing cavity with the housing cavity covered by the member. When the inflatable assembly is inflated, the inflatable assembly extends away from the housing, the inflated inflatable assembly disposed between the housing and the member.

20 Claims, 9 Drawing Sheets

SYSTEM, APPARATUS, AND METHOD FOR SUPPORTING A USER'S BODY

TECHNICAL FIELD

The present disclosure generally relates to a system, apparatus, and method for support, and more particularly to a system, apparatus, and method for supporting a user's body.

BACKGROUND

Long-distance travel typically involves a person remaining in a small or confined space such as an airplane seat, car seat, or train seat for a relatively long period of time. Long plane flights such as international or overnight flights or long car or train trips may be particularly burdensome for travelers based on the discomfort of remaining in a small plane seat, car seat, or train seat for long periods of time. Based on typical seat designs, a passenger often feels uncomfortable during travel and may have difficulty sleeping.

Conventional systems exist for attempting to increase a comfort level of passengers in such situations. Such conventional systems include neck pillows, inflatable pillows, and structural devices for supporting a passenger's head on a seat tray of a vehicle. However, such existing systems are typically cumbersome to carry, adjust or expand, or may involve a user assuming an unusual or unnatural position to attempt to sleep such as facing down toward an airplane seat tray or train seat tray.

U.S. Pat. No. 8,763,180 issued to Tsai (the '180 patent) attempts to address some of the above shortcomings in the prior art. The '180 patent discloses an inflatable height adjustable pillow including a neck support portion and a chin support portion. However, the conventional system of the '180 patent fails to provide a system for comfortably supporting a user's upper body such as, for example, maintaining a comfortable and natural position of a user's head and neck relative to a user's shoulders, chest, and torso.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to an apparatus. The apparatus includes a housing forming a housing cavity, an inflatable assembly attached to the housing, and a member attached to the inflatable assembly. When the inflatable assembly is deflated, the inflatable assembly is configured to be disposed in the housing cavity with the housing cavity covered by the member. When the inflatable assembly is inflated, the inflatable assembly extends away from the housing, the inflated inflatable assembly disposed between the housing and the member.

In another aspect, the present disclosure is directed to a method. The method includes providing an apparatus including a housing forming a housing cavity, an assembly attached to the housing, and a member attached to the assembly, disposing the assembly in the housing cavity and covering the assembly disposed in the housing cavity with the member when the assembly is deflated, and extending the assembly, which is disposed between the housing and the member, and the member away from the housing by inflating the assembly.

DETAILED DESCRIPTION AND INDUSTRIAL APPLICABILITY

Figure 8:
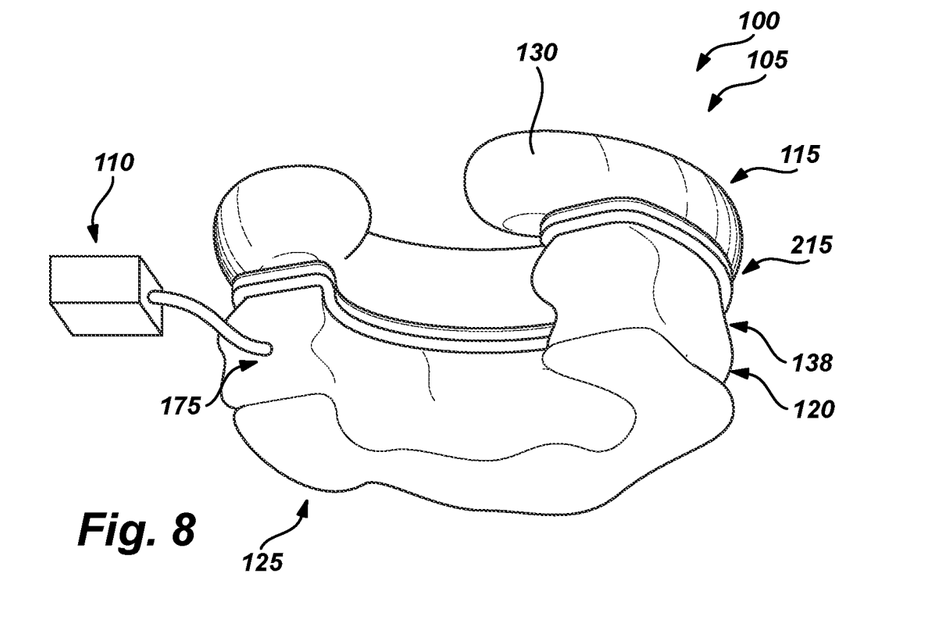
FIG. 8 is a perspective view of an exemplary embodiment of the present invention.
Figure 9:
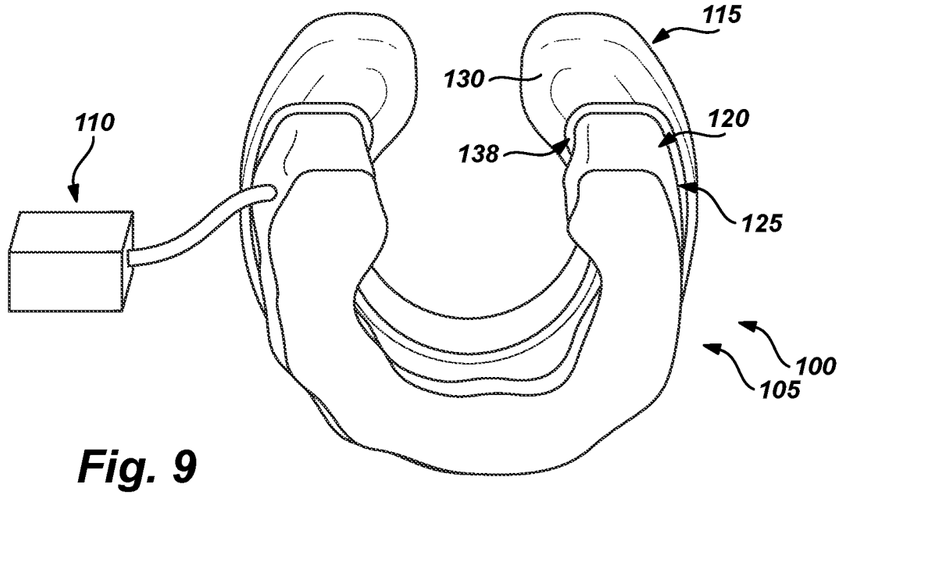
FIG. 9 is a bottom view of an exemplary embodiment of the present invention.

The exemplary disclosed system, apparatus, and method may include a system having a support assembly that may be changed between a plurality of configurations for supporting a user's body. FIGS. 1-7 illustrate an apparatus 105 of a system 100 configured in a compact configuration that may be used by a user in a compact mode. FIGS. 8 and 9 illustrate apparatus 105 being changed between a compact configuration and an expanded configuration. FIGS. 10-16 illustrate apparatus 105 configured in the expanded configuration that may be used by a user in an expanded mode. As illustrated in FIGS. 8 and 9, system 100 may include apparatus 105 and an expansion device 110. Expansion device 110 may operate to expand apparatus 105 from the compact configuration of FIGS. 1-7 to the expanded configuration of FIGS. 10-16 for example as illustrated in FIGS. 8 and 9 (e.g., and/or also to deflate apparatus 105).

Apparatus 105 may include a housing 115, an assembly 120, and a member 125. Member 125 may be removably disposed in a cavity of housing 115. Assembly 120 may be attached or formed between housing 115 and member 125.

Housing 115 may be any suitable assembly for housing (e.g., removably housing) assembly 120 and removably supporting member 125. Housing 115 may include an assembly of members that may be attached together via any suitable technique such as, for example, adhesive, stitching, fabric welding, mechanical fasteners (e.g., screws or bolts), and/or any other suitable type of attachment technique. Portions of housing 115 may also be integrally formed together as a single member.

Figure 1:
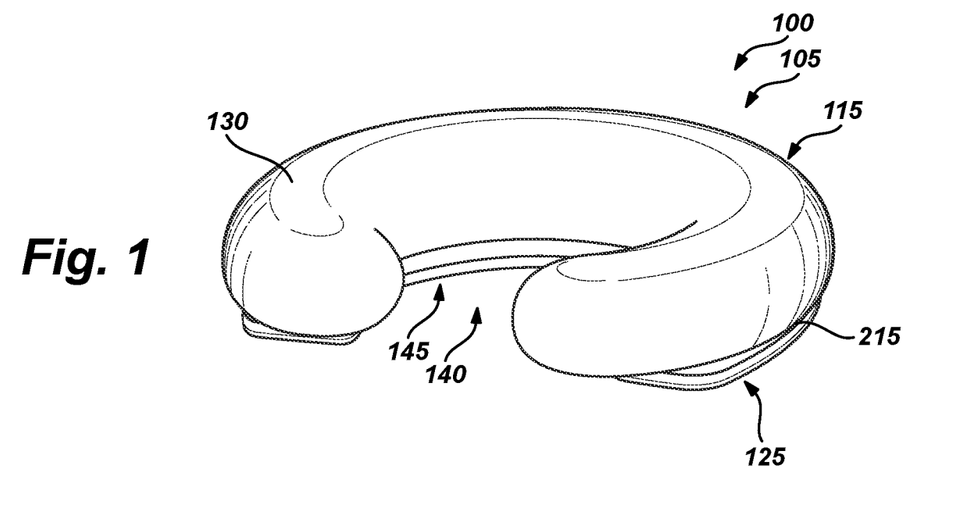
FIG. 1 is a perspective view of an exemplary embodiment of the present invention.
Figure 1A:
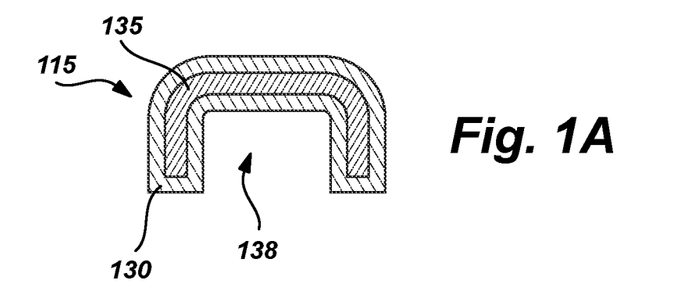
FIG. 1A is a sectional view of an exemplary embodiment of the present invention.
Figure 2:
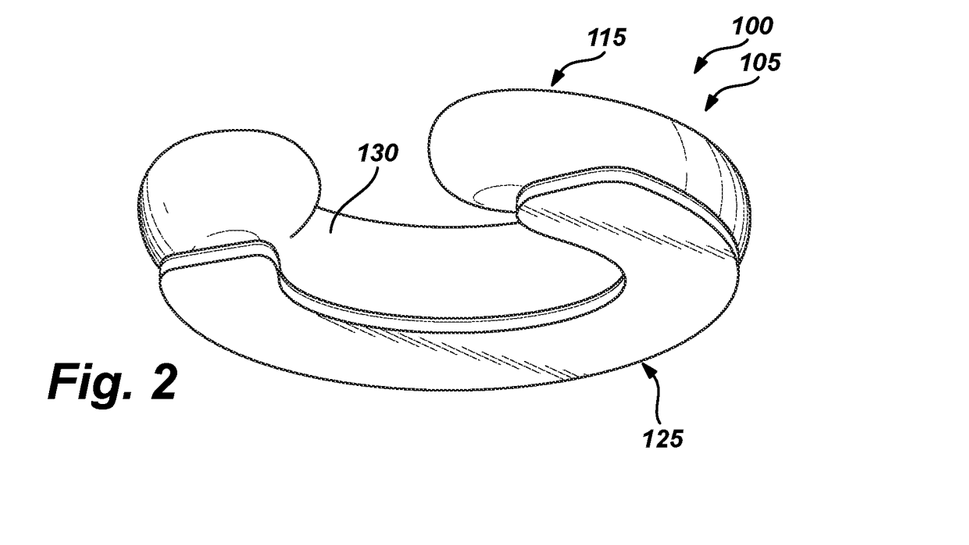
FIG. 2 is a perspective view of an exemplary embodiment of the present invention.
Figure 3:
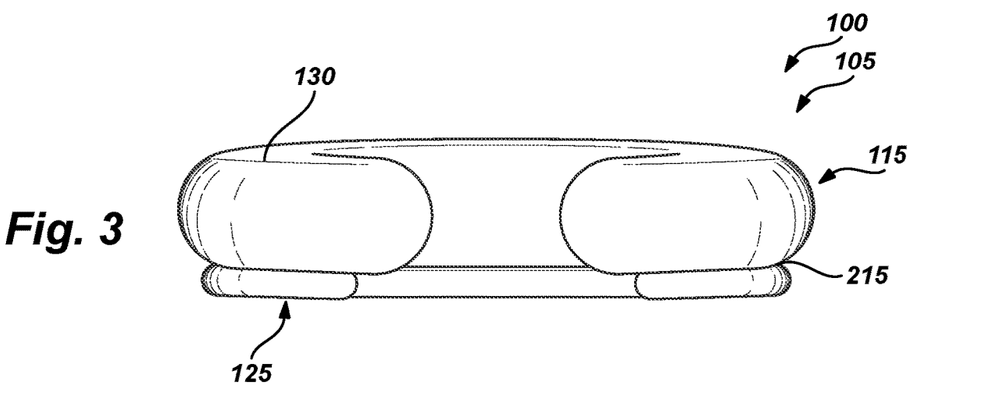
FIG. 3 is a front view of an exemplary embodiment of the present invention.
Figure 4:
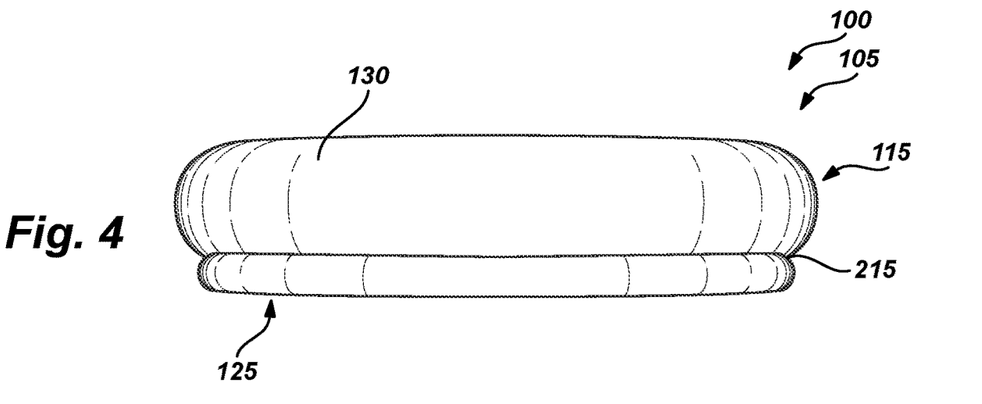
FIG. 4 is a back view of an exemplary embodiment of the present invention.

Housing 115 may be formed from any suitable material for supporting a user's body (e.g., a neck and head of a user), housing assembly 120, and/or supporting member 125. For example as illustrated in FIG. 1A, an exterior surface portion 130 of housing 115 may be formed from textile or fabric (e.g., cotton, polyester, silk, and/or any other suitable textile or fabric material), felt, natural fiber material, synthetic fiber material, cotton, and/or any other suitable material that may feel comfortable to a user. An inner portion 135 of housing 115 may include elastic or flexible material. Inner portion 135 may be disposed partially or substantially entirely within exterior surface portion 130. For example, inner portion 135 may include elastomeric material, rubber, foam material (e.g., open cell foam sheet material), and/or any other suitable elastic material. For example, exterior surface portion 130 may be formed from an exemplary disclosed material that may feel comfortable to a user. Inner portion 135 may include elastic material (e.g., rubber, foam, elastomeric material, polyester fiberfill, microbeads, and/or any other suitable elastic material) that may deform to comfortably fit a user's neck and/or head (e.g., when a user's head and/or neck applies force to housing 115). Inner portion 135 may also be formed from material similar to exterior surface portion 130. As illustrated in FIG. 1A (which illustrates an exemplary sectional view of housing 115), exterior surface portion 130 may form a housing cavity 138 that may extend along some or substantially an entire length of housing 115. For example, housing cavity 138 may extend annularly along an annular length of housing 115. Housing cavity 138 may be formed by a curved (e.g., concave or U-shaped) surface of exterior surface portion 130 for example as illustrated in FIG. 1A.

Figure 5:
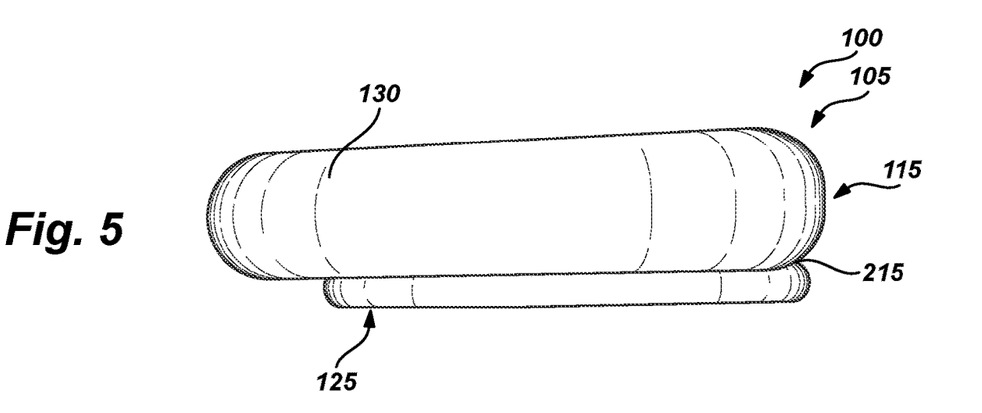
FIG. 5 is a side view of an exemplary embodiment of the present invention.
Figure 6:
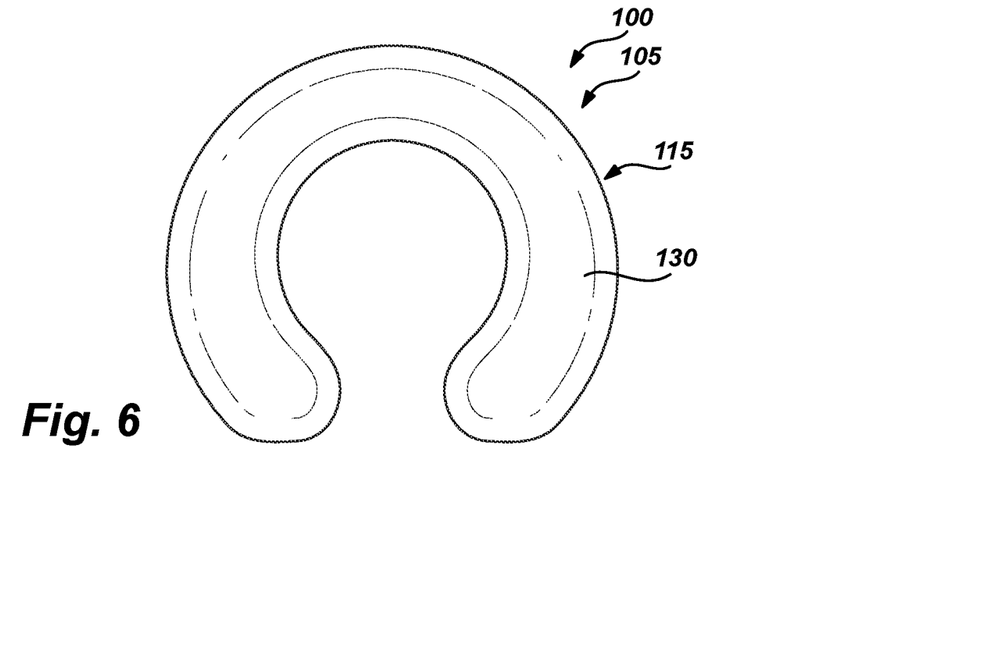
FIG. 6 is a top view of an exemplary embodiment of the present invention.
Figure 7:
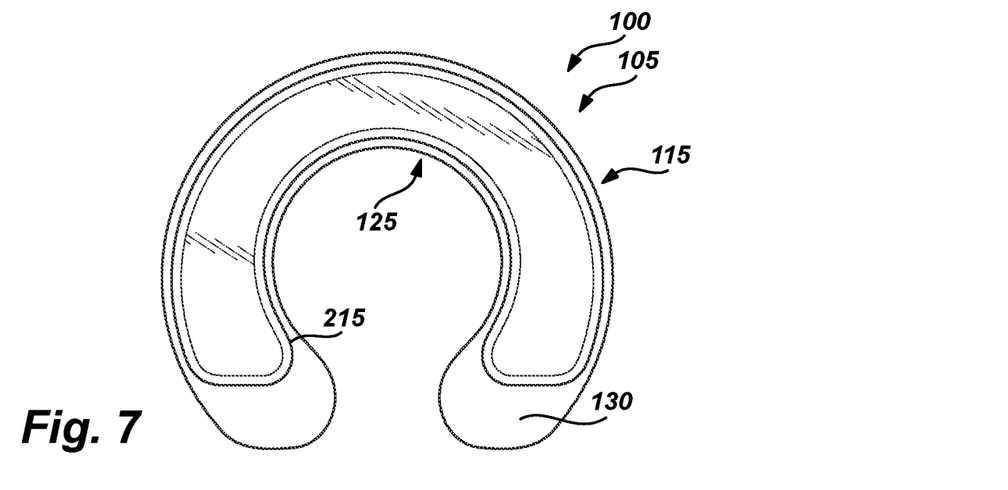
FIG. 7 is a bottom view of an exemplary embodiment of the present invention.
Figure 17:
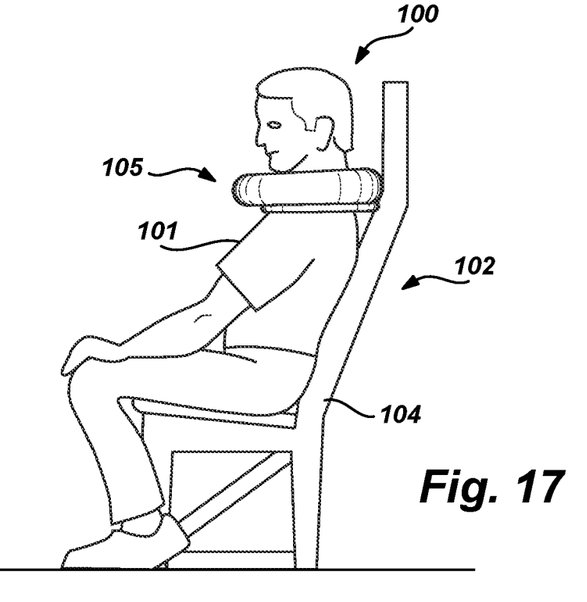
FIG. 17 is a side view of an exemplary embodiment of the present invention.

Housing 115 may be shaped or dimensioned in any suitable manner to comfortably support a user's body such as a user's neck and/or head. Housing 115 may be annular-shaped (e.g., have an annular, elliptical, or circular shape). As illustrated in FIGS. 1 and 17, a neck of a user 101 may fit through opening 140 of housing 115 and may be received in an aperture 145 of housing 115. The head and neck of user 101 may thereby be comfortably supported by the exemplary disclosed material of housing 115. A height of housing 115 may gradually or slightly increase in a direction moving from the front to the back of housing 115 for example as illustrated in FIG. 5 to provide increased comfort to the rear of a head of user 101 for example when user 101 is sleeping. In at least some exemplary embodiments, housing 115 may be a neck pillow.

FIGS. 1-7 illustrate the exemplary disclosed compact configuration of apparatus 105. In the compact configuration, housing 115 may house assembly 120 in housing cavity 138. For example as described below, assembly 120 may be housed in housing cavity 138 that may be covered (e.g., closed or sealed) by member 125 in the compact configuration. When apparatus 105 is in the compact configuration, user 101 may wear housing 115 as a comfort device for example as illustrated in FIG. 17. In at least some exemplary embodiments, user 101 may wear housing 115 as a pillow (e.g., a neck pillow) in any suitable setting such as, for example, a vehicle compartment 102 (e.g., cabin) of a plane, train, car, or any other suitable vehicle or location. For example, user 101 may sit on a seat 104 of vehicle compartment 102 while wearing housing 115 as a comfort device.

FIGS. 8 and 9 illustrate changing (e.g., switching) apparatus 105 between the compact configuration of FIGS. 1-7 and the expanded configuration of FIGS. 10-16. Assembly 120 for example in a deflated state may be removed from and/or disposed in or within housing cavity 138 of housing 115. For example when changing apparatus 105 from the compact configuration of FIGS. 1-7 to the expanded configuration of FIGS. 10-16, assembly 120 may be removed from housing cavity 138. When changing apparatus 105 from the expanded configuration of FIGS. 10-16 to the compact configuration of FIGS. 1-7, assembly 120 may be disposed in or within housing cavity 138.

FIGS. 10-16 illustrate the exemplary disclosed expanded configuration of apparatus 105, including assembly 120 disposed in the expanded configuration. Assembly 120 may include a plurality of members that may be attached together via any suitable technique such as, for example, adhesive, stitching, fabric welding, and/or any other suitable type of attachment technique. Assembly 120 may also include a plurality of members that may be integrally formed together. Assembly 120 may include a base member 150, a back strut member 155, and a plurality of front strut members 160 that may extend between housing 115 and member 125 when apparatus 105 is in the expanded configuration. Assembly 120 may be an inflatable assembly.

In at least some exemplary embodiments, members 150, 155, and 160 may be formed from flexible or elastic material that may be suitable for selective inflation and deflation. For example, members 150, 155, and 160 may be formed from natural rubber material, synthetic rubber material, elastomeric material, and/or any other suitable flexible or elastic material. In at least some exemplary embodiments, members 150, 155, and 160 may be formed from Polyvinyl chloride, Neoprene, chlorosulfonated polyethylene, Polyurethane, Vinyl, and/or any other suitable natural or synthetic flexible or elastic material.

Figure 10:
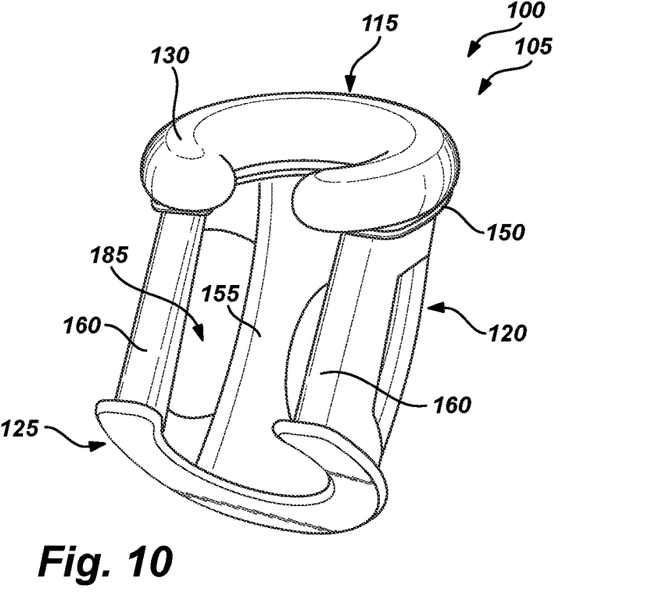
FIG. 10 is a perspective view of an exemplary embodiment of the present invention.
Figure 10A:
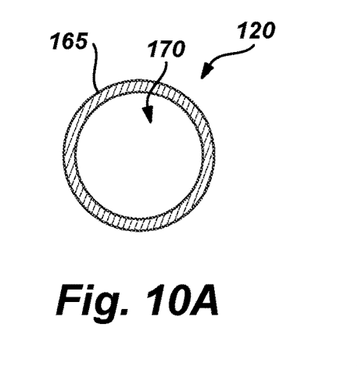
FIG. 10A is a sectional view of an exemplary embodiment of the present invention.

As illustrated in FIG. 10A (which illustrates an exemplary sectional view of members 150, 155, and 160 of assembly 120), members 150, 155, and 160 may include walls 165 that may be formed from the exemplary disclosed material described above. Wall 165 may be relatively thin compared to a width or diameter of members 150, 155, and 160. When assembly 120 is in the expanded configuration illustrated in FIGS. 10-16, wall 165 may form cavity 170. For example, members 150, 155, and 160 may be hollow members forming cavities 170. When assembly 120 is in the expanded configuration, cavity 170 may be partially or substantially entirely filled with air, water, helium, and/or any other suitable fluid gas and/or fluid liquid. For example, cavities 170 of members 150, 155, and 160 may be fluidly connected so that any suitable fluid gas and/or liquid may fill some or substantially all cavities 170 of assembly 120.

As illustrated in FIGS. 8 and 9, expansion device 110 may operate to fill cavities 170 of members 150, 155, and 160 with fluid gas and/or liquid. Expansion device 110 may be a pump such as, for example, a hand pump, a bellows foot pump, an electric pump, and/or any other suitable type of pump for inflating assembly 120. For example, expansion device 110 may include a dynamic pump such as a centrifugal pump and/or a positive displacement pump. Expansion device 110 may for example include a pressure gauge for measuring a pressure of fluid disposed in cavities 170 (e.g., to avoid underinflation or overinflation). Expansion device 110 may be fluidly connected to assembly 120 (e.g., to cavities 170) via one or more valves 175. Valve 175 may be formed from rigid material such as, for example, Polyvinyl chloride material and/or materials that may be similar to members 150, 155, and 160. Valve 175 may include a movable portion that may selectively open and close fluid communication with cavities 170 (e.g., opens to allow fluid to be pumped into cavities 170 to inflate assembly 120 when expansion device 110 is operating). Valve 175 may also include a seal (e.g., a plug) that may be selectively inserted into an aperture or port of valve 175 to seal fluid in assembly 120 to maintain an inflation of assembly 120. In at least some exemplary embodiments, valve 175 may be a one-way valve, a scupper valve, a Boston valve, and/or any other suitable valve for selectively inflating and deflating assembly 120. Valve 175 may be a pressure-relief valve. Assembly 120 may include one valve 175 that may be in fluid communication with substantially all cavities 170 of members 150, 155, and 160 so that assembly 120 may be inflated based on a single operation of a single expansion device 110. Cavities 170 may also be divided to form a plurality of inflatable compartments, with each compartment in fluid communication with a given valve 175 of a plurality of valves 175 disposed on assembly 120. Assembly 120 may also be manually inflated by user 101 based on user 101 blowing into valve 175 that may be a plastic valve having a plug or seal. Assembly 120 may be deflated based on an operation of expansion device 110 to draw fluid (e.g., air) out of cavities 170. Assembly 120 may also be manually deflated based on user 101 opening a plug or seal of valve 175 and squeezing assembly 120 to force fluid such as air out of cavities 170 to deflate members 150, 155, and 160.

Figure 14:
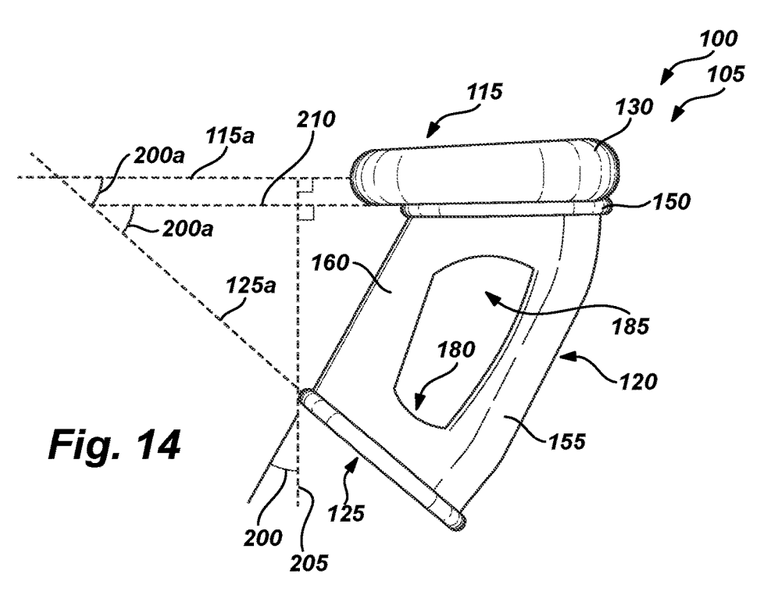
FIG. 14 is a side view of an exemplary embodiment of the present invention.
Figure 15:
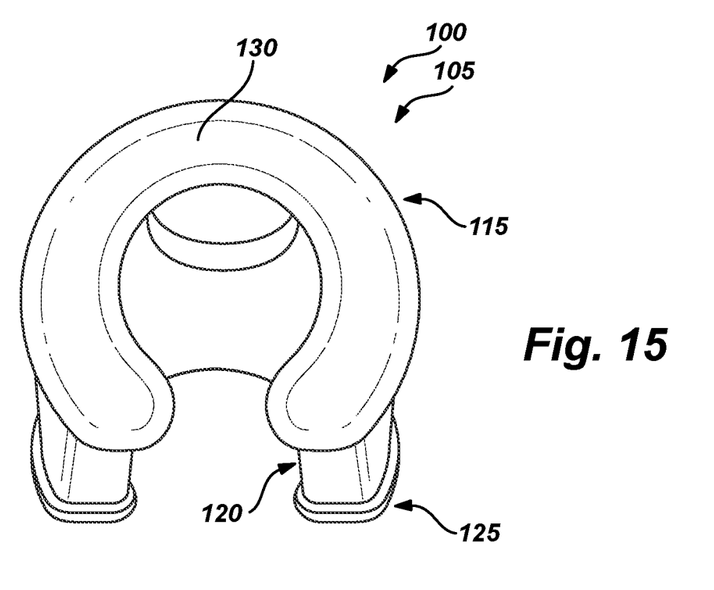
FIG. 15 is a top view of an exemplary embodiment of the present invention.
Figure 16:
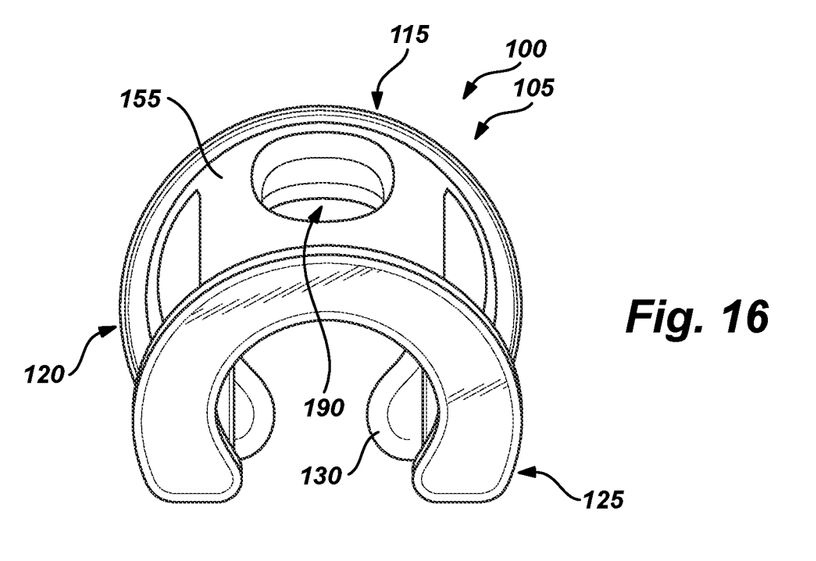
FIG. 16 is a bottom view of an exemplary embodiment of the present invention.
Figure 18:
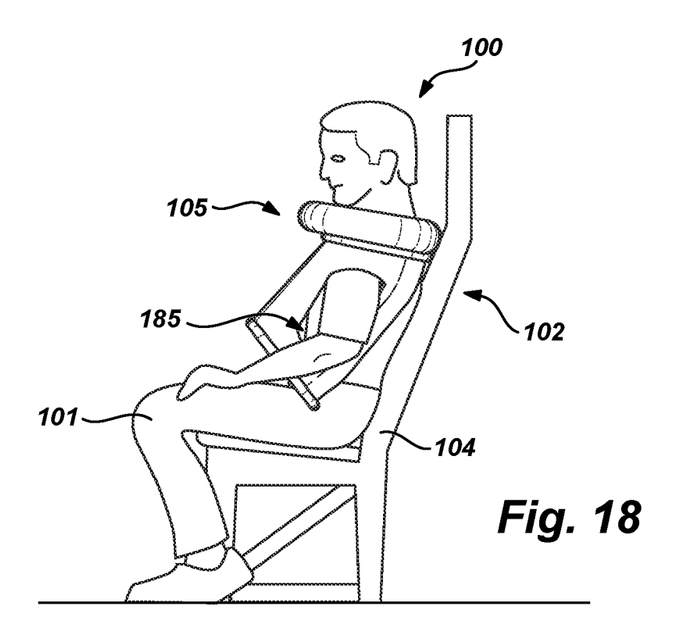
FIG. 18 is a side view of an exemplary embodiment of the present invention.

As illustrated in FIG. 14, front strut members 160 may be attached to back strut member 155 at a lower portion 180 of assembly 120 so that cavities 170 of members 155 and 160 may be in fluid communication. Arm apertures 185 may be formed between front strut member 160 and back strut member 155. For example when user 101 is wearing apparatus 105 as illustrated in FIG. 18, arms of user 101 may extend through arm apertures 185.

Figure 10B:
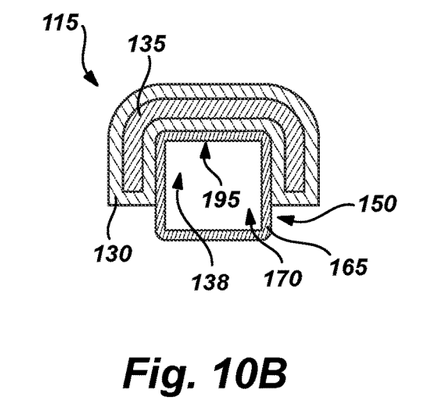
FIG. 10B is a sectional view of an exemplary embodiment of the present invention.
Figure 11:
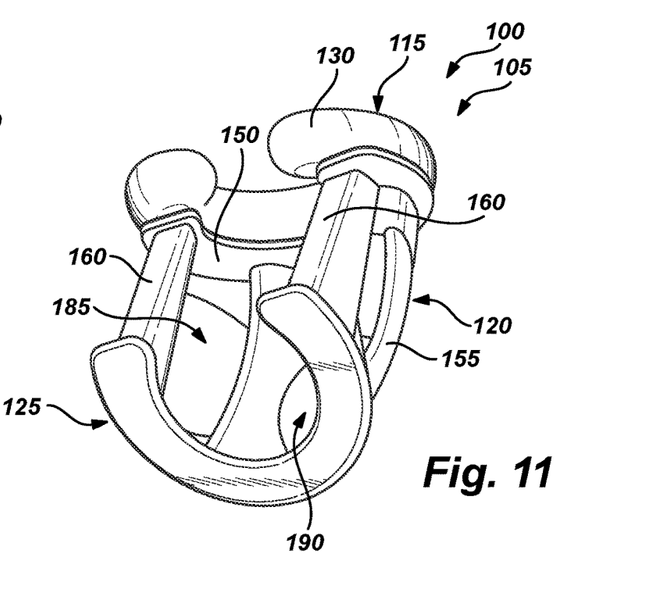
FIG. 11 is a perspective view of an exemplary embodiment of the present invention.
Figure 12:
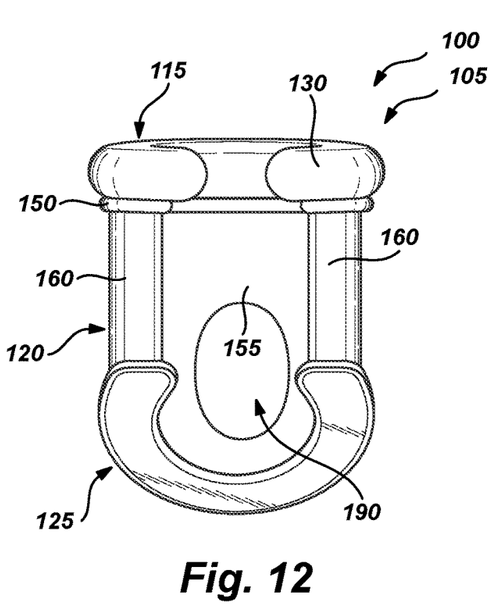
FIG. 12 is a front view of an exemplary embodiment of the present invention.
Figure 13:
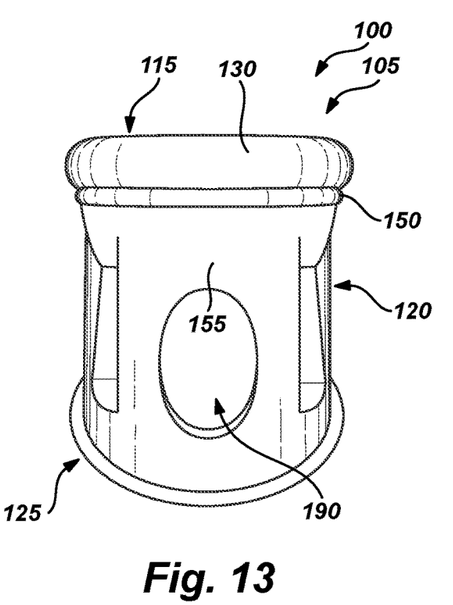
FIG. 13 is a back view of an exemplary embodiment of the present invention.

Returning to FIGS. 10-16, a back aperture 190 may be formed in back strut member 155. Base member 150 may be attached to housing 115 via any suitable technique such as, for example, adhesive, stitching, fabric welding, mechanical fasteners (e.g., screws or bolts), and/or any other suitable type of attachment technique. When assembly 120 is in the expanded configuration illustrated for example in FIGS. 10-16, some, most, or substantially all of inflated base member 150 may be disposed in housing cavity 138. For example as illustrated in FIG. 10B (which illustrates an exemplary sectional view of base member 150 and housing 115), a portion (e.g., some most, or substantially all) of base member 150 may be disposed in housing cavity 138 of housing 115. Base member 150 may be attached to an inner surface portion of housing cavity 138 at an attachment portion 195 via the exemplary disclosed attachment techniques.

In at least some exemplary embodiments and as illustrated in FIG. 14, when assembly 120 is in the expanded configuration, back strut member 155 and/or front strut member 160 may extend from base member 150 and housing 115 at an angle 200 from a vertical axis 205 of apparatus 105. Vertical axis 205 may be for example perpendicular (e.g., substantially perpendicular) to a longitudinal axis 210 of base member 150 (e.g., and/or a longitudinal axis 115a of housing 115, which may be an axis that may be disposed in a plane in which housing cavity 138 is located). Angle 200 may be any desired angle such as, for example, between about 10 degrees and about 45 degrees, between about 20 degrees and about 35 degrees, between about 25 degrees and about 35 degrees, or between about 28 degrees and about 32 degrees. In at least some exemplary embodiments, angle 200 may be about 30 degrees. For example, back strut member 155 and/or front strut member 160 may extend from base member 150 and housing 115 at angle 200 to provide additional comfort to a user wearing apparatus 105, to align arm apertures 185 comfortably for arms of user 101, to make it easier for user 101 to sleep, to make leaning back easier and more comfortable for user 101, and/or to make sitting in a seat more comfortable for user 101.

In at least some exemplary embodiments and as illustrated in FIGS. 1-7, member 125 may be disposed below housing 115 when apparatus 105 is in the compact configuration. Member 125 may be removably attached to housing 115 via a fastening device 215. Fastening device 215 may include one or more zippers, hook and loop fasteners, magnets, buttons, mechanical fasteners, clips, adhesive strips, retractable locking devices, friction-fit or press-fit seals or fasteners, compressible seals or fasteners, and/or any other suitable fastener. Fastening device 215 may be any suitable fastener for removably fastening member 125 to housing 115 to cover or seal housing cavity 138. Fastening device 215 may removably attach member 125 to housing 115 to maintain or contain assembly 120 in the compact configuration in housing cavity 138 for example as illustrated in FIGS. 1-7. Fastening device 215 may be operated (e.g., unfastened by user 101) to detach member 125 from housing 115. Assembly 120 may thereby be removed from housing cavity 138 for example as illustrated in FIGS. 8 and 9.

In at least some exemplary embodiments, member 125 may be formed from similar material as members 150, 155, and 160 of assembly 120. Member 125 may be integrally formed with or attached to back strut member 155 and front strut members 160 similarly to the attachment between members 150, 155, and 160 for example as described above. Member 125 may include a cross-section similar to members 150, 155, and 160 for example as described above regarding FIG. 10A and may include one or more cavities 170 formed by walls 165 that may be in fluid communication with cavities 170 of members 150, 155, and 160. Member 125 may thereby be inflated (e.g., based on an operation of expansion device 110) and deflated similarly to members 150, 155, and 160 as described above. Member 125 may thereby act as a member (e.g., an integral member) of assembly 120. When apparatus 105 is in the expanded configuration for example as illustrated in FIG. 14, member 125 (e.g., a longitudinal axis 125a of member 125) may be rotated relative to longitudinal axis 210 (e.g., and/or longitudinal axis 115a) by angle 200a that may be similar to (e.g., equal to or substantially equal to) angle 200 described above. In at least some exemplary embodiments, a surface portion formed from material similar to exterior surface portion 130 of housing 115 may be attached to a bottom surface of member 125 so that a bottom surface of apparatus 105 including a bottom surface of member 125 and housing 115 may be formed from similar material when apparatus 105 is in the compact configuration.

In at least some exemplary embodiments, member 125 may be a substantially solid (e.g., solid member) and may not include a cavity such as cavity 170. For example, member 125 may be a substantially solid member formed from material similar to exterior surface portion 130 of housing 115 (e.g., and may include an inner portion similar to inner portion 135). For example, member 125 may not be an inflatable and deflatable member and may remain in the same shape in both the compact configuration illustrated in FIGS. 1-7 and the expanded configuration illustrated in FIGS. 10-16. For example, member 125 that may be a substantially solid member that may be removably attached to housing 115 via fastening device 215. Member 125 that may be a substantially solid member may be attached to back strut member 155 and front strut members 160 via any suitable attachment technique such as, for example, adhesive, stitching, fabric welding, mechanical fasteners (e.g., screws or bolts), and/or any other suitable type of attachment technique.

In at least some exemplary embodiments, housing 115, assembly 120, and member 125 may be formed from the exemplary disclosed materials and may have varying relative stiffness (e.g., stiffness, firmness, rigidity, or inelasticity). In at least some exemplary embodiments, member 125 may be formed from material that may be similar to the exemplary disclosed material of members 150, 155, and 160 of assembly 120 (e.g., a first material). Housing 115 may be formed from a second material (e.g., similar to the exemplary disclosed material of exterior surface portion 130 and/or inner portion 135) that may have a greater stiffness (e.g., be stiffer) than the first material of assembly 120. Housing 115 may thereby be formed from stiffer material than assembly 120 and member 125.

In at least some exemplary embodiments, member 125 may be formed from material that may be similar to the exemplary disclosed material (e.g., the second material) of housing 115 (e.g., similar to the exemplary disclosed material of exterior surface portion 130 and/or inner portion 135) that may have a greater stiffness (e.g., be stiffer) than the first material of assembly 120. Housing 115 and member 125 may thereby be formed from stiffer material than assembly 120.

The exemplary disclosed system, apparatus, and method may be used in any suitable application for maintaining a user's comfort while sitting in a small or confined space for a relatively long period of time. For example, the exemplary disclosed system, apparatus, and method may be used in any suitable application involving a user maintaining the same position (e.g., sitting position) for a relatively long period of time such as being a passenger on a plane, train, car, or other vehicle. For example, the exemplary disclosed system, apparatus, and method may be used in any suitable application in which a user may desire to sleep while sitting down. The exemplary disclosed system, apparatus, and method may be used in any suitable application in which a user may maintain a same position such as a sitting position for a relatively long period of time.

Figure 19:
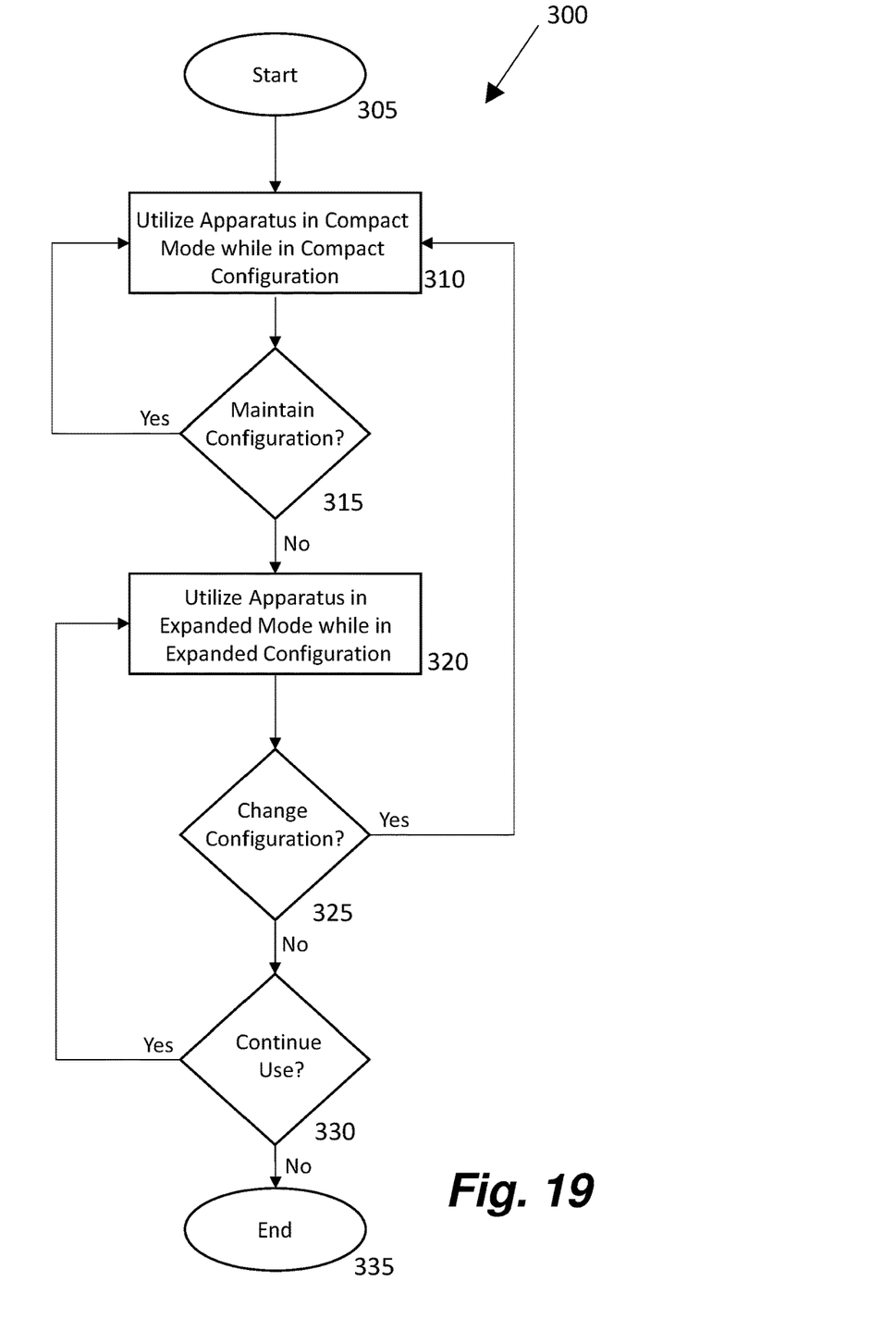
FIG. 19 illustrates an exemplary process of at least some exemplary embodiments of the present disclosure.

FIG. 19 illustrates an exemplary operation of the exemplary disclosed system 100. Process 300 begins at step 305. At step 310, user 101 may utilize apparatus 105 in the compact configuration for example as illustrated in FIGS. 1-7. User 101 may use apparatus 105 in the compact mode for example as illustrated in FIG. 17. For example, user 101 may wear apparatus 105 in the compact configuration (e.g., as a pillow such as a neck pillow) while seated in seat 104 of vehicle compartment 102.

Returning to FIG. 19, user 101 may determine at step 315 whether or not to maintain the configuration of apparatus 105 in the compact configuration for example as illustrated in FIGS. 1-7. If user 101 chooses to maintain the compact configuration for example to continue wearing apparatus 105 or to transport apparatus 105, then process 300 returns to step 310. If user 101 does not wish to maintain apparatus 105 in the compact configuration, process 300 proceeds to step 320. Alternatively if user 101 is finished using apparatus 105, process 300 may end at step 335.

At step 320, user 101 may change apparatus 105 from the compact configuration to the expanded configuration for example as illustrated in FIGS. 10-16. For example as illustrated in FIGS. 8 and 9, user 101 may detach member 125 from housing 115 as described above. User 101 may then pull member 125 away from housing 115, thereby pulling back strut member 155 and front strut members 160 out of housing cavity 138 as illustrated in FIGS. 8 and 9. User 101 may extend assembly 120 out, which may be deflated, by pulling housing 115 and member 125 away from each other. User 101 may then inflate assembly 120 (e.g., and/or member 125) via an operation of expansion device 110 and/or manually for example as described above. User 101 may substantially fully inflate assembly 120. User 101 may thereby configure apparatus 105 in the expanded configuration for example as illustrated in FIGS. 10-16. User 101 may use apparatus 105 in the expanded mode for example as illustrated in FIG. 18. For example, user 101 may wear apparatus 105 in the expanded configuration (e.g., to comfortably support the head and neck of user 101 relative to the shoulders, chest, and torso of user 101) while seated in seat 104 of vehicle compartment 102.

At step 325, user 101 may determine whether or not to change the configuration of apparatus 105 from the expanded configuration for example as illustrated in FIGS. 10-16 to the compact configuration for example as illustrated in FIGS. 1-7. If user 101 chooses to change apparatus from the expanded configuration back to the compact configuration, process 300 may return to step 310. User 101 may deflate assembly 120 (e.g., and/or member 125) manually and/or via an operation of expansion device 110 for example as described above. User 101 may dispose (e.g., push or insert) deflated assembly 120 into housing cavity 138. Once assembly 120 has been disposed in housing cavity 138, user 101 may removably attach member 125 to housing 115 for example as described above, thereby securing or sealing assembly 120 in housing cavity 138 that may be covered or sealed by member 125 for example as illustrated in FIGS. 1-7. User 101 may then use apparatus 105 in the compact mode for example as described above at step 310.

If user 101 decides at step 325 to not change the configuration of apparatus 105, process 300 may proceed to step 330. At step 330, user 101 may determine whether or not to continue to use apparatus 105. If user 101 decides to continue to use apparatus 105, process 300 returns to step 320. Steps 310 through 330 may be repeated for as many iterations as desired for example as described above. If user 101 decides to not continue use of apparatus 105, process 300 ends at step 335.

In at least some exemplary embodiments, step 310 may alternatively include utilizing apparatus 105 in the expanded mode while in the expanded configuration, and step 320 may alternatively include utilizing apparatus 105 in the compact mode while in the compact configuration. Process 300 may proceed similarly to as described above, with apparatus 105 being used first in the expanded configuration and then used in the compact configuration if desired by user 101.

In at least some exemplary embodiments, the exemplary disclosed apparatus may include a housing (e.g., housing 115) forming a housing cavity (e.g., housing cavity 138), an inflatable assembly (e.g., assembly 120) attached to the housing, and a member (e.g., member 125) attached to the inflatable assembly. When the inflatable assembly is deflated, the inflatable assembly may be configured to be disposed in the housing cavity with the housing cavity covered by the member. When the inflatable assembly is inflated, the inflatable assembly may extend away from the housing, the inflated inflatable assembly disposed between the housing and the member. The inflatable assembly may be formed from a first material and the housing may be formed from a second material having a greater stiffness than the first material. The member may be formed from the first material. The member may be formed from the second material. When the inflatable assembly is inflated, the inflatable assembly may extend away from the housing at an angle from a vertical axis of the apparatus, the vertical axis being perpendicular to a longitudinal axis of the housing. The angle may be between 25 degrees and 35 degrees. When the inflatable assembly is inflated, the member may be spaced from the housing based on the inflatable assembly extending away from the housing, a longitudinal axis of the member being disposed at an angle relative to a longitudinal axis of the housing. The angle may be between 28 degrees and 32 degrees. A first end portion of the inflatable assembly may be attached to the housing and a second end portion of the inflatable assembly may be attached to the member, the first end portion being disposed at an opposite side of the inflatable assembly as the second end portion. The inflatable assembly may be attached to the housing by being attached to a surface of the housing cavity. When the inflatable assembly is inflated, an inflated base member of the inflatable assembly may be disposed in the housing cavity and a plurality of inflated strut members that fluidly communicate with the base member may extend away from the housing. The housing may be annular-shaped and the housing cavity may extend annularly along an annular length of the housing.

In at least some exemplary embodiments, the exemplary disclosed method may include providing an apparatus including a housing (e.g., housing 115) forming a housing cavity (e.g., housing cavity 138), an assembly (e.g., assembly 120) attached to the housing, and a member (e.g., member 125) attached to the assembly, disposing the assembly in the housing cavity and covering the assembly disposed in the housing cavity with the member when the assembly is deflated, and extending the assembly, which may be disposed between the housing and the member, and the member away from the housing by inflating the assembly. The exemplary disclosed method may also include covering the assembly disposed in the housing cavity with the member by removably attaching the member to the housing. The exemplary disclosed method may further include inflating the member, which fluidly communicates with the assembly, by inflating the assembly. The exemplary disclosed method may also include a user inserting the user's arms through a plurality of arm apertures of the assembly when the assembly is inflated and the user is wearing the housing around the user's neck as a neck pillow.

In at least some exemplary embodiments, the exemplary disclosed apparatus may include a neck pillow (e.g., housing 115) forming a housing cavity (e.g., housing cavity 138), an inflatable assembly (e.g., assembly 120) attached to the neck pillow, and a member (e.g., member 125) attached to the inflatable assembly. When the inflatable assembly is deflated, the inflatable assembly may be configured to be disposed in the housing cavity with the housing cavity covered by the member. When the inflatable assembly is inflated, the inflatable assembly may extend away from the neck pillow, the inflated inflatable assembly disposed between the neck pillow and the member. The inflatable assembly may be formed from a first material and the neck pillow may be formed from a second material having a greater stiffness than the first material. When the inflatable assembly is inflated, the inflatable assembly may extend away from the neck pillow at an angle of between 25 degrees and 35 degrees from a vertical axis of the apparatus, the vertical axis being perpendicular to a longitudinal axis of the neck pillow. The member may be a solid member formed from the second material. The member may be an attached hollow member formed from the first material and attached to the inflatable assembly that may be formed from a plurality of hollow members, the attached hollow member and the plurality of hollow members forming cavities that fluidly communicate with each other.

In at least some exemplary embodiments, the exemplary disclosed system, apparatus, and method may provide an efficient and effective system for comfortably supporting a user's upper body for example during a plane, train, or car trip. The exemplary disclosed system, apparatus, and method may provide for maintaining a comfortable and natural position of a user's head and neck relative to a user's shoulders, chest, and torso. The exemplary disclosed system, apparatus, and method may allow for a user to sit comfortably for an extended period of time in a confined space such as an airplane, train, or car seat.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An apparatus, comprising:
    a housing forming a housing cavity;
    an inflatable assembly attached to the housing; and
    a member attached to the inflatable assembly;
    wherein when the inflatable assembly is deflated, the inflatable assembly is configured to be disposed in the housing cavity with the housing cavity covered by the member; and
    wherein when the inflatable assembly is inflated, the inflatable assembly extends away from the housing, the inflated inflatable assembly disposed between the housing and the member and completely separating the housing from the member.

2. The apparatus of claim 1, wherein the inflatable assembly is formed from a first material and the housing is formed from a second material having a greater stiffness than the first material.

3. The apparatus of claim 2, wherein the member is formed from the first material.

4. The apparatus of claim 2, wherein the member is formed from the second material.

5. The apparatus of claim 1, wherein when the inflatable assembly is inflated, the inflatable assembly extends away from the housing at an angle from a vertical axis of the apparatus, the vertical axis being perpendicular to a longitudinal axis of the housing.

6. The apparatus of claim 5, wherein the angle is between 25 degrees and 35 degrees.

7. The apparatus of claim 1, wherein when the inflatable assembly is inflated, the member is spaced from the housing based on the inflatable assembly extending away from the housing, a longitudinal axis of the member being disposed at an angle relative to a longitudinal axis of the housing.

8. The apparatus of claim 7, wherein the angle is between 28 degrees and 32 degrees.

9. The apparatus of claim 1, wherein a first end portion of the inflatable assembly is attached to the housing and a second end portion of the inflatable assembly is attached to the member, the first end portion being disposed at an opposite side of the inflatable assembly as the second end portion.

10. The apparatus of claim 1, wherein the inflatable assembly is attached to the housing by being attached to a surface of the housing cavity.

11. The apparatus of claim 1, wherein when the inflatable assembly is inflated, an inflated base member of the inflatable assembly is disposed in the housing cavity and a plurality of inflated strut members that fluidly communicate with the base member extend away from the housing.

12. The apparatus of claim 1, wherein the housing is annular-shaped and the housing cavity extends annularly along an annular length of the housing.

13. A method, comprising:
providing an apparatus including a housing forming a housing cavity, an assembly attached to the housing, and a member attached to the assembly;
disposing the assembly in the housing cavity within the housing and covering the assembly disposed in the housing cavity with the member when the assembly is deflated; and
extending the assembly, which is disposed between the housing and the member, and the member away from the housing by inflating the assembly, the member being completely detached from the housing.

14. The method of claim 13, further comprising covering the assembly disposed in the housing cavity with the member by removably attaching the member to the housing.

15. The method of claim 13, further comprising inflating the member, which fluidly communicates with the assembly, by inflating the assembly.

16. The method of claim 13, further comprising a user inserting the user's arms through a plurality of arm apertures of the assembly when the assembly is inflated and the user is wearing the housing around the user's neck as a neck pillow.

17. An apparatus, comprising:
a neck pillow forming a housing cavity;
an inflatable assembly attached to the neck pillow; and
a member attached to the inflatable assembly;
wherein when the inflatable assembly is deflated, the inflatable assembly is configured to be disposed in the housing cavity with the housing cavity covered by the member;
wherein when the inflatable assembly is inflated, the inflatable assembly extends away from the neck pillow, the inflated inflatable assembly disposed between the neck pillow and the member;
wherein the inflatable assembly is formed from a first material and the neck pillow is formed from a second material having a greater stiffness than the first material; and
wherein the member is completely detached from the housing when the inflatable assembly is inflated.

18. The apparatus of claim 17, wherein when the inflatable assembly is inflated, the inflatable assembly extends away from the neck pillow at an angle of between 25 degrees and 35 degrees from a vertical axis of the apparatus, the vertical axis being perpendicular to a longitudinal axis of the neck pillow.

19. The apparatus of claim 17, wherein the member is a solid member formed from the second material.

20. The apparatus of claim 17, wherein the member is an attached hollow member formed from the first material and attached to the inflatable assembly that is formed from a plurality of hollow members, the attached hollow member and the plurality of hollow members forming cavities that fluidly communicate with each other.

* * * * *